May 31, 1927.
J. R. LAMBERTON
1,630,620
INSTALLATION FOR HANDLING AND SHEARING METAL PLATES FROM PLATE ROLLING MILLS
Filed Dec. 27, 1926     5 Sheets-Sheet 5
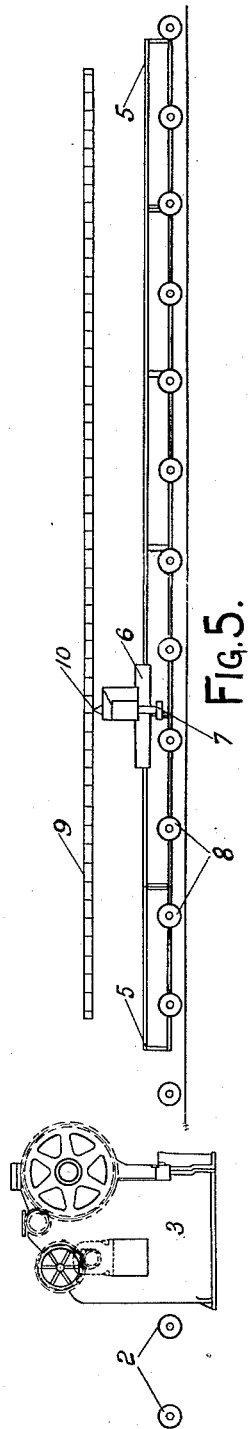
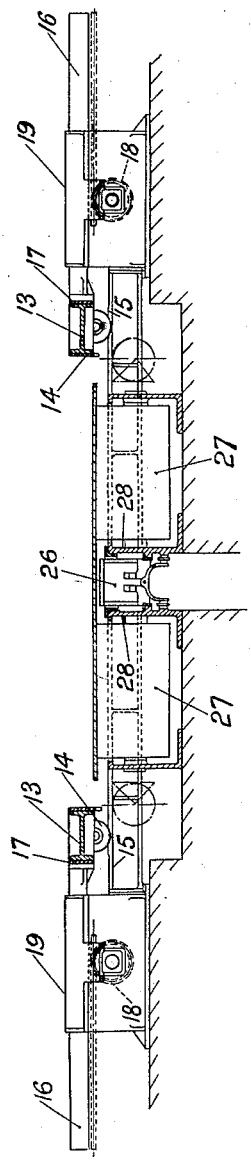
INVENTOR.
John R Lamberton
by Fetherstonhaugh Co
Atty Patented May 31, 1927.

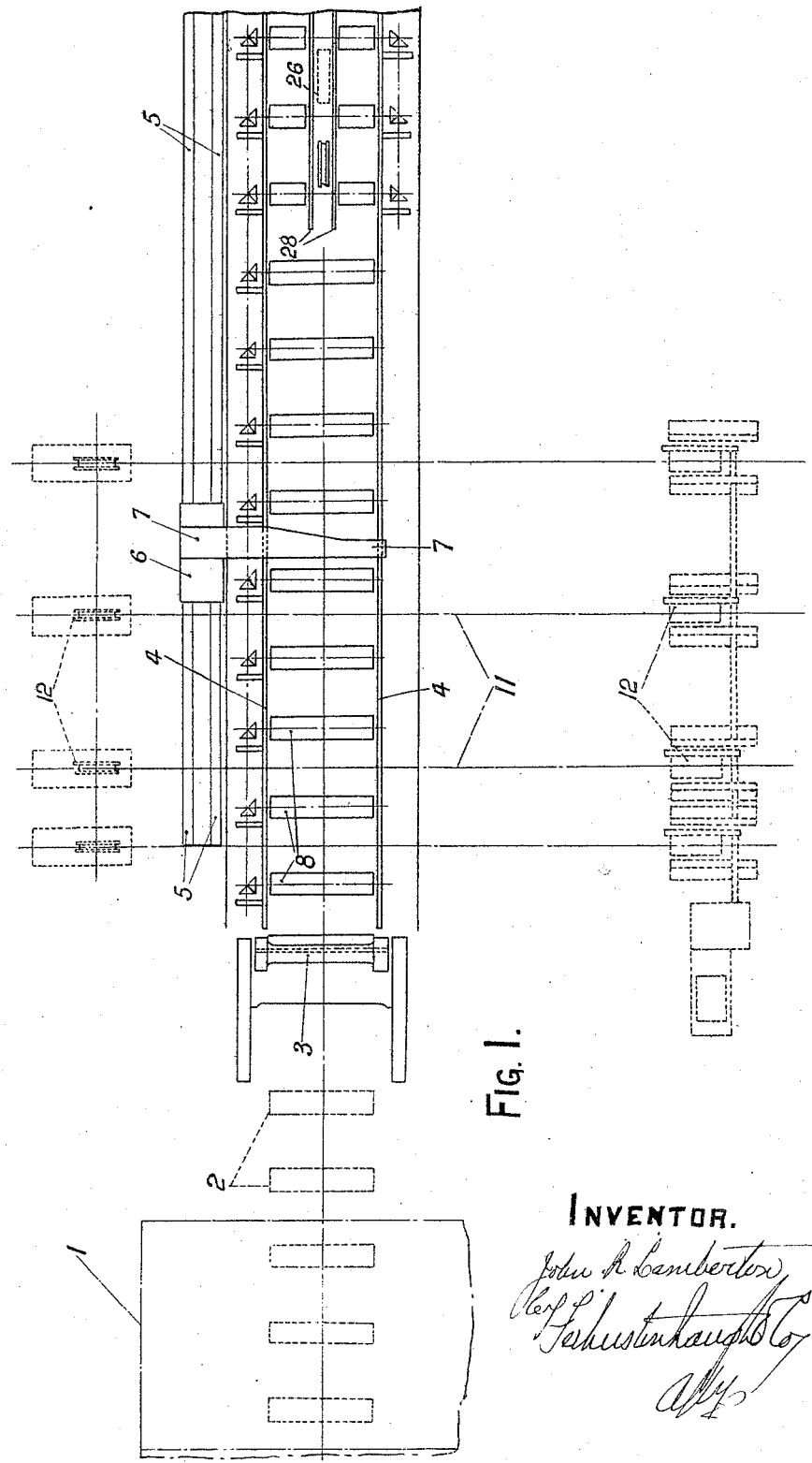

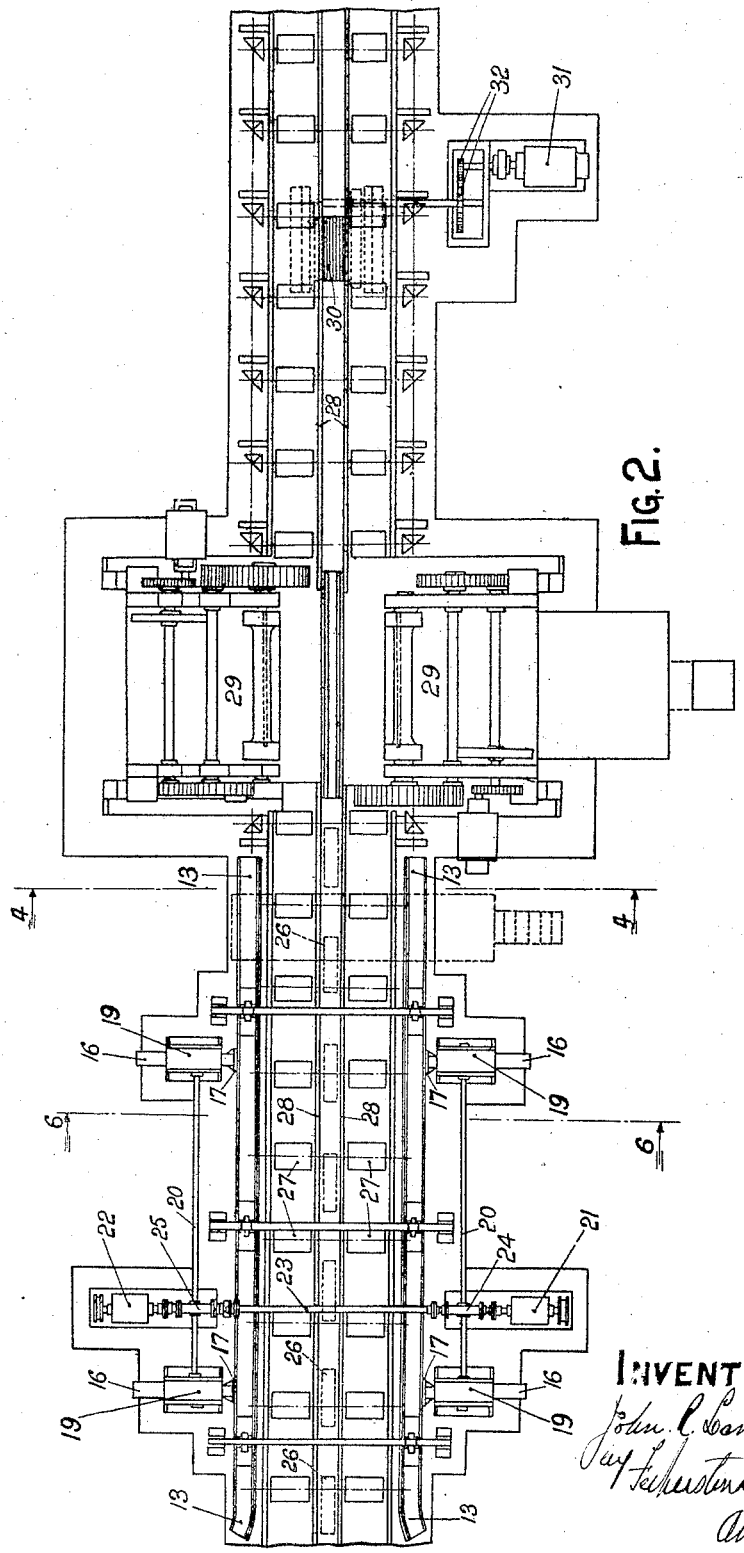

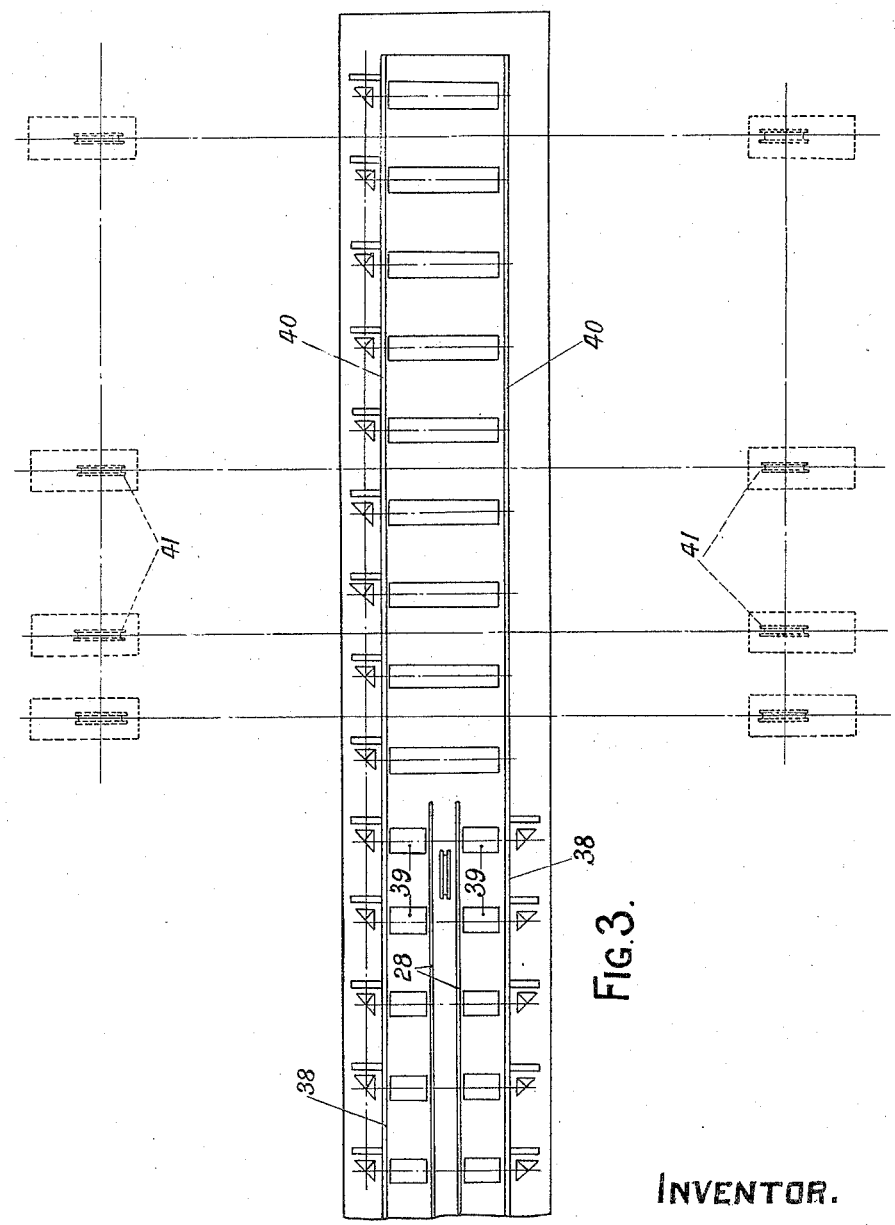

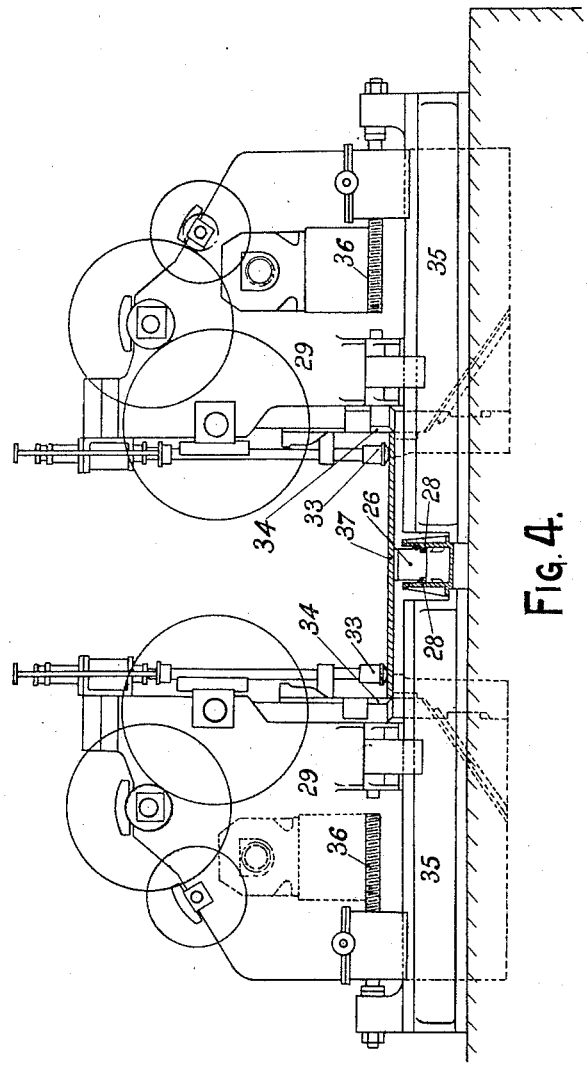

1,630,620

UNITED STATES PATENT OFFICE.

JOHN ROBERTSON LAMBERTON, OF COATBRIDGE, SCOTLAND.

INSTALLATION FOR HANDLING AND SHEARING METAL PLATES FROM PLATE-ROLLING MILLS.

Application filed December 27, 1926, Serial No. 157,358, and in Great Britain October 9, 1926.

This invention relates to an installation for handling and shearing metal plates from plate-rolling machines contrived to avoid the necessity for marking off the plates before shearing and to reduce the amount of labour in handling the plates at the side-shearing machines to a minimum.

The complete installation includes cross-cutting shears through which the plate runs after leaving the cooling bank, and in which it is cross-cut to length, and a delivery table over which the cut length passes; the length cut being gauged by a measuring stop mechanism. Beyond the point where the plate is cross-cut to length, is a setting table associated with a setting device. The setting device comprises two long movable parallel side guides adapted to be set at any required distance from the centre line of the machine so that a plate of any width may be set with its edges equidistant from the centre line. To take care of the plate when set, there are provided transfer clamps which are fixed to the plate as soon as set; associated with these clamps is a clamp-transfer drive which when put in operation ensures that the clamps pull the plate on to the side-cutting shears. These clamps may be magnetic or mechanical and of any convenient number and they are so guided as to travel along the centre line aforesaid or parallel to this line and, therefore, constrain the plate attached to them to travel in the same general direction. The side-cutting shears may be of the guillotine or of the rotary type and may be electrically or hydraulically driven. These shears are mounted on massive slides and provided with rack-and-pinion or screw-and-nut drives, such that the shears may be set closer to or further apart from the centre line aforesaid, so that any ordinary width of plate may be sheared by the knives acting simultaneously on each side of the plate.

The action at this stage is as follows:—

The transfer clamps bring the loading portion of the plate up on to the bolster of the side-cutting shears; the holding-down devices (if the shears are guillotine shears) are put into operation and the cut takes place. The aprons of the shears come back to the top position, the holding-down devices are raised and the clamps, which have never released their grip, pull the plate forward an amount equal to the length of the knife, ready for another cut, and so on till the entire length of the plate is sheared on both sides. If the shears be of the rotary type, then the action is continuous, i. e., the shears continue to cut while the clamps pull the plate through the machine and no holding-down devices are provided or is necessary.

After the side cutting operation the clamps are released, leaving the plate on a delivery table, whence it is despatched to a run-out table and thence to loading banks; the clamps, meanwhile, returning to the setting table, ready to grip another plate.

In the accompanying drawings which illustrate diagrammatically a plate shearing installation according to the invention Figs. 1, 2 and 3 are fragmentary plan views showing respectively the cooling bank end, the centre portion and the loading bank end of the installation; Fig. 4 is a vertical section on the line 4—4 of Fig. 2 drawn to a larger scale; Fig. 5 is a fragmentary side elevation; Fig. 6 is a vertical section on the line 6—6 of Fig. 2 drawn to a larger scale.

Referring to Fig. 1, 1 denotes a cooling bank from which the plates pass on rollers 2 to a delivery table 4 on which they are cross-cut to length by cross-cut shears 3; the length cut being determined by measuring stop mechanism comprising a saddle 6 mounted for movement on slideways 5 alongside the table 4 and carrying an arm 7 disposed transversely of the table, the arm serving as a gauge stopper for the plates as they are carried over the table 4 on mechanically driven rollers 8. The arm 7 may be set at any required distance from the cross-cut shears 3 by reference to a graduated scale 9 (Fig. 5) disposed above the table 4 and associated with an index finger 10 carried by the saddle 6. The stopper arm 7 is shiftable vertically so that it can be moved out of the path of the plate when cross-cut.

Disposed transversely of the delivery table 4 is transverse gear 11 actuated by mechanism indicated generally at 12 for withdrawing sketch plates from the delivery table.

The setting device, Figs. 2 and 6 comprises two long parallel guides 13 mounted one at each side of the longitudinal centre line of the setting table and equidistant from said line, being supported by wheels 14 bearing on transverse rails 15 so that the guides may be moved towards or away from the said longitudinal centre line while being maintained parallel therewith and equidistant therefrom.

Actuating mechanism for moving the guides 13 comprises racks 16 operatively connected with the outer flanges of the guides at 17 and meshing with pinions 18 journalled in casings 19. The pinions 18 are mounted on shafts 20 driven by motors 21, 22, the rotor shafts of which are connected by a shaft 23 which transmits motion to the shafts 20 through gears housed in casings 24, 25.

By means of the described mechanism the guides 13 are set to deal with the width of the plate being handled.

Transfer clamps 26 (assumed to be of the magnetic type) are disposed along the centre line of the setting table between plate-supporting rollers 27 being guided to travel between guides 28. These clamps engage the plate as it enters between the guides 13 and pull it towards side cutting shears 29 (Figs. 2 and 4) disposed on each side of the setting table. Clamp transfer mechanism 30 for operating the clamps 26 is driven by a motor 31 through gearing 32.

Plate holding-down devices 33 (Fig. 4) are fitted to the side-cutting shears 29, said devices being arranged to come into operation concomitantly with each working stroke of the knives 34 of the shears which shear the longitudinal edges of the plate.

The side-cutting shears are mounted on massive slides 35 provided with screw and nut mechanism 36 so that the shears may be adjusted relative to the centre line of the setting table in order to deal with varying widths of plates.

The knives 34 engage a plate 37 (Fig. 4) simultaneously, the plate being fed forward by the transfer clamps 26 after each working stroke of the shears 29, the holding down devices 33 releasing the plate before it is fed forward.

A delivery table 38 (Fig. 3) receives the plates from the side-cutting shears 29. From the table 38 the plates are transferred by mechanically driven rollers 39 to a run-out table 40 associated with transfer gear 41 for transferring the plates to loading banks.

What I claim is:

An installation for handling and shearing metal plates from plate-rolling machines comprising cross-cutting shears for cutting the plate to length, measuring stop mechanism for gauging the length cut, a delivery table to receive the cut length, a setting device beyond the cross-cutting shears, said setting device including movable parallel side guides adapted to be set at any required distance from the centre line of said setting device, transfer clamps adapted to be fixed to the plate when set and adapted to travel along said centre line, side-cutting shears including massive slides movable transversely of said centre line, means for setting the side cutting shears closer to or further apart from said centre line, a delivery table beyond the side-cutting shears and clamp transfer mechanism for pulling the plate to and past the side cutting shears to said last mentioned table.

In testimony whereof I have signed my name to this specification.

JOHN ROBERTSON LAMBERTON.